United States Patent [19]

Ergler et al.

[11] 4,436,001
[45] Mar. 13, 1984

[54] CENTRIPETAL CUTTER AND STRIPPER APPARATUS

[75] Inventors: James M. Ergler, Friendsville, Pa.; Harold Kohn, Endwell; Michael Smetana, Johnson City, both of N.Y.

[73] Assignee: International Business Machines Corporation, Armonk, N.Y.

[21] Appl. No.: 387,992

[22] Filed: Jun. 14, 1982

[51] Int. Cl.³ .............................................. H02G 1/12
[52] U.S. Cl. ................................... 81/9.51; 29/564.4; 29/566.3; 83/924
[58] Field of Search ............. 81/9.51; 29/564.4, 566.3; 83/924

[56] References Cited

U.S. PATENT DOCUMENTS

| 1,306,588 | 6/1919 | France | 81/9.51 |
| 2,112,396 | 3/1938 | Corrigan | 164/60 |
| 2,827,811 | 3/1958 | Dymeck | 81/9.51 |
| 3,540,333 | 11/1970 | Johnson | 82/53.1 |
| 3,772,945 | 11/1973 | Varga | 82/70.2 |
| 3,915,537 | 10/1975 | Harris et al. | 339/64 R |

Primary Examiner—Roscoe V. Parker
Attorney, Agent, or Firm—Norman R. Bardales

[57] ABSTRACT

Stripping and cutting apparatus in which a pair of disc cutters are affixed on a common rotatable shaft that is pivotably mounted to a rotating head. An object having an inner core member and an outer concentric member, which in the preferred embodiment is insulated conductive tubing, is advanced through a central opening in the head. The speed of the head is controlled so that at one speed the shaft is centripetally pivoted to an inner radial position that causes the closest of the cutters to block the leading end of the object, and so that at another faster speed the shaft is centrifugally pivoted to an outer radial position which removes the particular cutter from the blocking relationship with the leading end of the object thereby allowing the object to be advanced past the remote cutter for a predetermined distance, and so that at another speed, which is less than the last mentioned speed, the shaft is centripetally pivoted inward to provide concurrent cutting of the object by the two disc cutters. One of the cutters cuts a piece from the object and another cuts a portion of the outer member of the object, which portion is stripped from the cut piece by and between the cutters. The aforementioned closest cutter acts as reference plane for cutting the object in respective uniform lengths for the pieces and/or portions.

10 Claims, 11 Drawing Figures

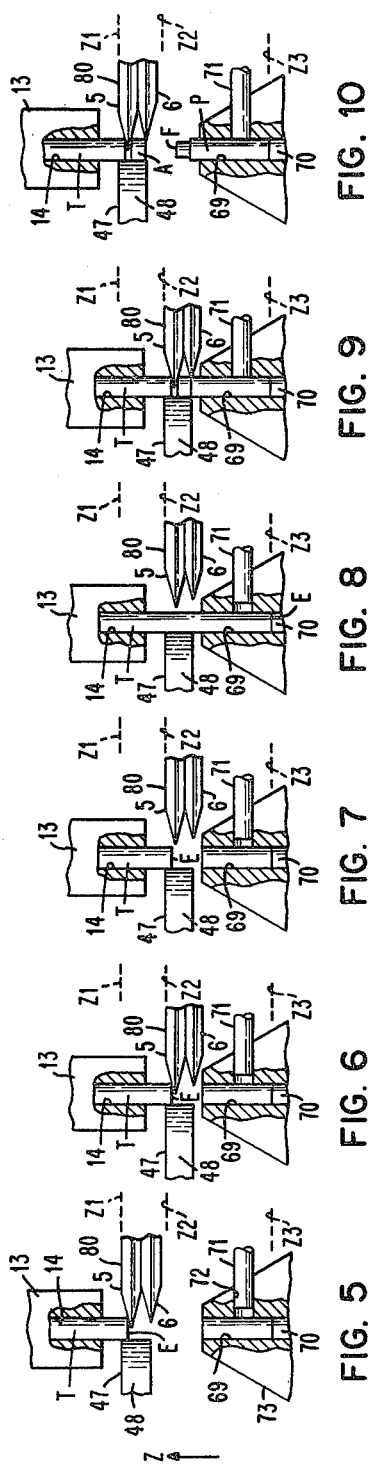
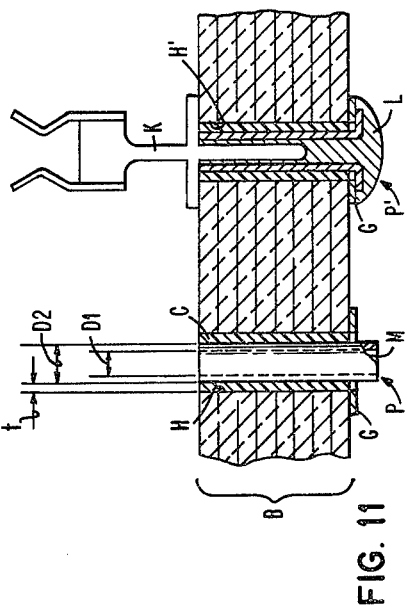
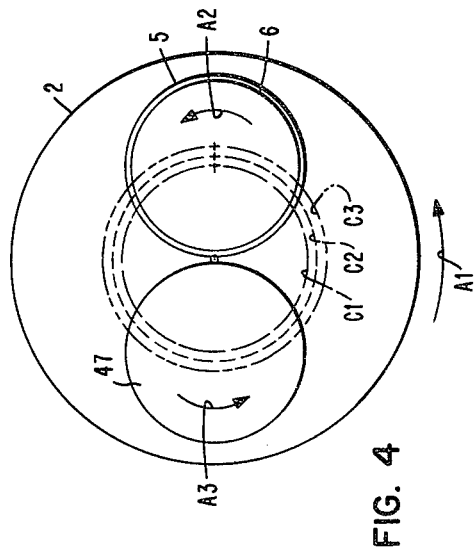

CENTRIPETAL CUTTER AND STRIPPER APPARATUS

BACKGROUND OF THE INVENTION

1. Field of the Invention

This invention relates to cutter and/or stripper apparatus and more particularly for cutter and/or stripper apparatus for objects having relatively small cross sections.

2. Description of the Prior Art

In certain applications there is a need to cut and/or strip objects with relatively small cross sections. The need is even more acute particularly in applications for cutting and/or stripping objects that are easily deformable or distortionable but it is desired to keep the objects from being deformed or distorted during the cutting and/or stripping operation(s).

One such application arises in the manufacture of certain type inserts for printed circuit boards, where the inserts and/or boards are precision components. One particular insert has a thin walled conductive hollow core and a concentric outer insulative sleeve or coating. The insert is made from flexible tubing stock consisting of a metal, e.g. copper, hollow core and an outer conformal dielectric coating or sleeve. The stock is cut into sections or pieces, and a portion of the sleeve is cut and stripped from one end of each section to form an insert.

The insert is used in connection with the repair of defective plated through holes, i.e. via holes, in certain laminated multilayer printed circuit boards. After predrilling the defective hole to remove its associated plating, the insert is inserted in the via hole with the non-stripped part being located within the hole and with the stripped part, herein sometimes referred to as the extension, protruding outwardly from the hole on one side of the board. The outer diameter of the insert and the diameter of the drilled out defective hole are compatible so as to effect a snug-like fit between the two. The dielectric sleeve insulates the section's conductive core from any inner plane conductive members of the board which may be adjacent to the wall of the hole.

With the aid of a special tool, the stripped extension is then formed into a substantially planar flange on an annular pad which was previously formed as part of the printed circuitry on the aforementioned one side of the board concentrically about the periphery of the hole. On the opposite side of the board, a connector, which is a slightly modified configuration of the bifurcated connector type that is described in U.S. Pat. No. 3,915,537 assigned to the common assignee herein, is next inserted by the pretinned base of its stem through the opening of the hollow core of the insert. A reflow solder process bonds the inserted stem base to the insert's core and the insert's flange to the aforementioned pad of the board.

Heretofore, the cutters and strippers of the prior art were not conducive to providing cutting and stripping operations for objects having small cross sections such as, for example, the aforementioned thin wall tubing. It was found that conventional cutters and strippers subjected the object to deformation and distortion. For example, in the aforedescribed application, the inserts would easily be crushed during the cutting and stripping operations associated with the conventional cutters and strippers. As a result, the distorted or deformed inserts were not insertable in the via holes and/or the stem bases of the aforementioned connectors were not insertable in the deformed or distorted cores. Moreover, the apparatus of the prior art were susceptible to providing skewed and ragged cuts in the object, i.e the core and/or insulation.

Cutters and strippers of the prior art, of which we are aware, are not generally applicable to cutting and stripping objects of small cross section for many reasons. One reason is that in many applications the prior art apparatus are intended to cut or strip relatively gross type objects which have relatively liberal tolerance requirements. These prior art apparatus are thus generally not concerned with the accuracy and reliability required for the cutting or stripping of objects which have high tolerance requirements and/or which also may be precision components as well, and hence are incapable of doing so. This is particularly true where the components are ultra-miniature electrical/electronic components requiring precision dimensions and shapes for mechanical and/or electrical compatibility with the ultimate system in which they are to be incorporated. Examples of such prior art apparatus are described in U.S. Pat. Nos. 1,306,588, 2,112,396, 3,540,333 and 3,772,945.

These last mentioned patents are also typical of apparatus where the cutter mechanism is radially mounted on a rotatable or rotary head relative to the axis of rotation of the head. In this type of apparatus, referred to herein as rotary head cutters or simply as rotary cutters, the object to be cut is positioned within the head in coincidence with the axis of rotation such that as the head is rotating the orbiting cutting mechanism performs the cutting operation. Heretofore, in the prior art complex mechanical systems were required for movement of the the cutter mechanism toward and/or away from the object, and the movement is done in a constant, i.e. non-variable, or an uncontrolled manner.

Thus, referring to U.S. Pat. No. 1,306,588, the wire stripper apparatus thereof cuts the insulation at one end of an insulated conductive wire and from which end the insulation is to be stripped. More particularly, in the apparatus of U.S. Pat. No. 1,306,588, two straight edge cutters, i.e. chisel type cutter blades or knives, are each part of one of the two independent dual mechanical linkage systems. Each system moves its particular one blade in a radial direction and is mounted with its particular blade on a common spindle head. The spindle head has a central opening through which is positioned the end of the wire having the uncut insulation to be stripped. In each linkage system, the blade is pivotally mounted to one side of a lever, which is in turn pivotally mounted to the head. The blade has an elongated guiding slot through which passes a guide screw affixed to the head. A bias spring is affixed to the screw and to the lever on the other side of the lever pivot. A centrifugal weight is carried at the end of the lever that is on the same last mentioned side of the lever pivot.

In operation, when the spindle head is stationary, each bias spring positions the respective lever about its pivot so as to maintain the particular centrifugal weight toward and the particular cutter blade away from the central opening and hence away from the end of the insulated wire. When the head is rotating, in response to centrifugal force the weight of each linkage system moves in a radially outward direction overcoming the spring bias and thereby causing the lever to pivot and the blade to move in a radially inward direction via the coaction of the guide slot and screw. Thus, the cutting edges of the two blades are advanced toward each other by their respective linkage systems. Upon contacting the insulation, the cutting edges of the two orbiting blades circumferentially score the insulation on opposite sides of the wire resulting from the combined orbital motion of the blades caused by the rotating head and the continuing inward radial advancement of the blades caused by their respective linkage systems. With the aid of appropriate stops, the inward radial advancement is stopped when the insulation is completely severed through and thereafter the severed insulation piece is removed or stripped by pulling the wire to expose the portion of the inner conductor from which the piece has been stripped.

Prior art apparatus such as the type described in U.S. Pat. No. 1,306,588 has several limitations which do not make it conducive to cutting objects of small cross section such as, for example, the aforedescribed precision inserts. For one thing, the end of the wire being stripped is maintained free, i.e. unsupported, thereby making it vulnerable to deflection and hence a concomitant misalignment in its orientation with respect to the two cutter blades thereby resulting in a skewed and/or ragged cut of the insulation and/or undesirable cutting of the wire conductors. In addition, without precise diametrical and planar alignment of the two blades and/or synchronized movement of the two blades, the wire is subject to deflection if contacted by one blade before being contacted by the other blade and hence results in the insulation being skewed cut and/or ragged cut as well as undesirable cutting of the conductors. Hence, such apparatus is generally unreliable for cutting objects with small cross sections and/or for making clean, high tolerance, precision cuts. Its reliability is further compromised because of the difficulty in obtaining dual linkage systems with precisely matching counterpart elements and characteristics and/or the relatively large number of moving parts required by the dual linkage system, which by the way increases the cost of making and assembly of such systems and their parts. Moreover, the apparatus requires that the wire to be stripped must be fed thereto while the head is stationary so that the cutter blades are not obstructing its passage. Hence, it is not conducive for adaptation to mass production as it requires intermittent stopping and starting of the head rotation thereby increasing time and cost in processing the wire therethrough. In addition, another mechanism is required to cut the wire in a prior operation thereby further subjecting the object to additional chances of being deformed or distorted.

U.S. Pat. No. 2,112,396 is another example of a rotary cutter. It has a disc knife and two back up rollers, the three being symmetrically positioned about the central axis of the head. A shift mechanism shifts the knife and two rollers in a radial inward direction to bring them into contact with the tube stock to be cut. The knife and two rollers are mounted on individual blocks. Each block has an individual cam follower pin affixed to it. An outer concentric shiftable gear, with internal teeth coacting with four symmetrically spaced pinion gears, when shifted in the proper direction rotates an inner concentric gear with external teeth that also coact with the pinion gears. The inner gear carries three cam slots, each of which coacts with one of the cam follower pins. Thus, when the external gear is shifted and the internal gear in response shifts a corresponding predetermined angle, the resultant camming action moves the blocks, which are positioned in radial slots, in a radially inward direction. As a result, the knife and rollers move in a likewise radial inward direction from their retracted positions relative to the centrally aligned tube stock to positions of contact with the tube stock.

However, while this is being done, the head is not rotating. Once contact is made and the knife thereby makes an initial incision in the tube stock wall, the rotation of the head is initiated. The head is rotated at a high speed and orbits the contacting blade and rollers around the tube wall causing them to rotate on their own respective axes as well. The tube wall is circumferentially cut by the knife until a piece is completely severed from the stock. However, in the cutter of U.S. Pat. No. 2,112,396, centrifugal force is undesirable because it tends to react on the blocks in a radially outward direction and thus pull the knife and rollers away from the stock thereby adversely affecting the cutting operation. To overcome this, unbalanced weighted levers are required and arranged to exert a centrifugal force in opposition to that being exerted on the blocks.

Again, the rotary cutter of U.S. Pat. No. 2,112,396 is not conducive for cutting objects of small cross section such as thin wall stock. For one thing, the use of three contact elements, i.e. the knife and two rollers, establishes a finite limit as to the size of the tube stock that can be fitted in the space defined between the three elements. That is to say, the smallest space defined between the three elements occurs when the three elements are in contact with one another. When the three are in such contact, a diameter size is established by the circle defined by the three respective midpoints located on the respect circumferential peripheries of the three contacting elements, which midpoints lie between the three respective points of contact of the three elements. Hence, any stock with a nominal diameter size equal to or less than the aforedescribed established size cannot be cut with the apparatus of U.S. Pat. No. 2,112,396.

Moreover, if the tube stock being cut by the apparatus of U.S. Pat. No. 2,112,396 is not rigid but is flexible, then without precise synchronized movement of the knife and two rollers, the tube stock is subject to deflection, resulting in skewed and/or ragged cuts and thereby making the apparatus unreliable. Its reliability is further compromised because of the difficulty in obtaining knife and roller systems with precisely matching counterpart components and characteristics and/or the relatively large number and complexity of moving parts required by such systems, which also by the way increases the cost of making and assembly of such systems and their parts. Moreover, because the head is required to be stationary while the cutter knife and rollers are being positioned to contact the stock, it is therefore not conducive for adaptation to mass production as it requires intermittent stopping and starting the rotation thereby increasing time and cost in processing the stock therethrough.

For similar reasons, the tube cutters of U.S. Pat. No. 3,540,333 and 3,772,945 are also inadequate for cutting objects with small cross sections and in particular objects such as the aforedescribed precision inserts. In U.S. Pat. No. 3,540,333, three orbital cutter wheels are carried on lever arms pivotally mounted on a rotating wheel and are brought into contact with a three ply paper tubing stock by a cinch cable encircling pulleys on the lever arms. The apparatus requires concurrent rotation of the head, counter rotation of the tubing, and linear motions of the head and tubing in the same direction, which linear motions must also be synchronized with the linear motion of the tubing which feeds it to the apparatus.

The disk cutter blade and two non-cutting roller disks of U.S. Pat. No. 3,772,945 are mounted on individual slides that are spring biased in an outwardly radial direction. A linear actuated camming member is required to shift the three elements, i.e. the blade and two roller disks, radially inward so as to contact the tube, as the three elements orbit about the tube.

Thus, the rotary cutters of these last two mentioned patents likewise suffer from the same deficiencies of the first two mentioned patents. Without precise synchronized movement of the three contact elements, the tube is subject to deflection and hence to being skewed and/or ragged cut, which are not tolerable in high tolerance cut type applications such as the aforedescribed precision inserts. Hence, the apparatus of these last two mentioned patents are not generally reliable. Moreover, in the case of the apparatus of U.S. Pat. No. 3,540,333, if the aforedescribed linear motion of the tubing should get out of synchronization with the feed advance motion, the tubing is subject to deflection, distortion and skewed and/or ragged cuts.

The reliability of the apparatus of these last two mentioned patents is still further compromised because of the difficulty in obtaining three element contact systems, i.e. the lever system of U.S. Pat. No. 3,540,333 and the cam system of U.S. Pat. No. 3,772,945, with precisely matching counterpart components and characteristics and/or the relatively large number and complexity of moving parts required by such apparatus, and which it again is pointed out increases the cost of making and assembly of such systems and their parts.

For another thing, as explained previously with respect to the three contact element system of U.S. Pat. No. 2,112,396, each of the respective three contact element systems of U.S. Pat. Nos. 3,540,333 and 3,772,945 likewise establishes a finite limit as to the diameter size of the object that can be fitted in the space defined between the three elements, and any object with a diameter size less than or equal to the finite limit is unable to be cut.

Moreover, in none of the aforedescribed prior art apparatus is a variable control provided for the radial movement of their respective moving elements.

SUMMARY OF THE INVENTION

It is an object of this invention to provide a rotary cutter that is highly reliable, relatively simple and easily controllable.

It is another object of this invention to provide a rotary cutter that places the cutter blade in and out of contact with the object to be cut by variable control of the speed of the rotating head thereof.

Another object of this invention is to provide a rotary cutter for cutting objects having relatively small cross-sections such as, for example thin walled tubing and the like, in a highly reliable and non-deformable and distortionless manner.

Another object of this invention is to provide a rotary cutter for cutting objects having relatively small cross sections without the necessity of stopping the head rotation so as to be able to advance the object before and after cutting and/or to radially advance or withdraw the cutter blade with respect to the object.

Still another object of this invention is to cut objects having small cross sections and without a limitation on the minimum size of the objects that can be cut thereby.

Still another object of this invention is to provide a rotary cutter for concurrently cutting a precision length piece from an insulated conductive tubing stock and a precision length portion of the insulation on the piece being cut.

According to one aspect of the present invention, there is provided apparatus for cutting a piece from an elongated object, which has an inner core member and a concentric outer member, and for cutting a predetermined portion of the outer member from the piece. The apparatus has a head which is rotatable about a predetermined first axis. The head has an opening that is concentric with the first axis. First and second disc cutters are mounted on a common shaft with a predetermined spacing between them. The shaft is rotatable about a second axis, and is pivotably mounted to the head at a predetermined distance from the first axis. The first disc cutter is positioned between the opening and the second disc cutter. The apparatus has means for positioning the object for advancement through the opening coincidently along the first axis in a direction toward the cutters. Variable speed drive means continuously rotates the head about the first axis.

More particularly, the head is rotated by the variable speed drive means at a first speed which pivots the shaft to a first inner radial position that places the first disc cutter in contacting and obstructing relationship with the leading end of the object to prevent the advancement of the object. The head is rotated by the drive means at an increased second speed relative to the first speed which pivots the shaft centrifugally to a second outer radial position that displaces the first cutter from the contacting and obstructing relationship with the leading end of the object to allow further advancement of the object in the direction along the first axis to a predetermined axial position along the first axis that is beyond the second disc cutter. The head is rotated by the drive means when the object is in the predetermined axial position at a predetermined reduced third speed relative to the second speed that pivots the shaft centripetally radially inward towards the first axis thereby placing at least one of the first and second cutters in predetermined respective lateral contacting relationship with the object. This effects, in coaction with the rotation of the head about the first axis, the rotation of the shaft and the first and second cutters about the second axis. The rotation of the head about the first axis in coaction with the rotation of the first and second cutters about the second axis effects the concurrent cutting of the piece from the object and the portion from the outer member by the first and second cutters, respectively.

According to another aspect of the invention, in the last described apparatus, the cut portion is positioned between the two cutters, and the cut portion is removed from the cut end of the piece by a predetermined relative axial displacement along the first axis between the cut piece and the head whereby the cut portion is carried between and by the two cutters.

The foregoing and other objects, features and advantages of the invention will be apparent from the more particular description of the preferred embodiment of the invention, as illustrated in the accompanying drawing.

BRIEF DESCRIPTION OF THE DRAWING

FIG. 4 is a reduced schematic bottom view of the rotary head of FIG. 2 taken along the line 4—4 thereof;

FIGS. 5–10 are partial schematic side views, partially shown in cross section, of the relative different positions of the cutter blades of the rotary head and tube stock during the operation of the apparatus of FIG. 1; and FIG. 11 is a partial cross section view of a multiple layer printed circuit board utilizing inserts cut and stripped by the apparatus of FIG. 1.

In the figures, like elements are designated with similar reference numbers.

DESCRIPTION OF THE PREFERRED EMBODIMENT

Figure 1:
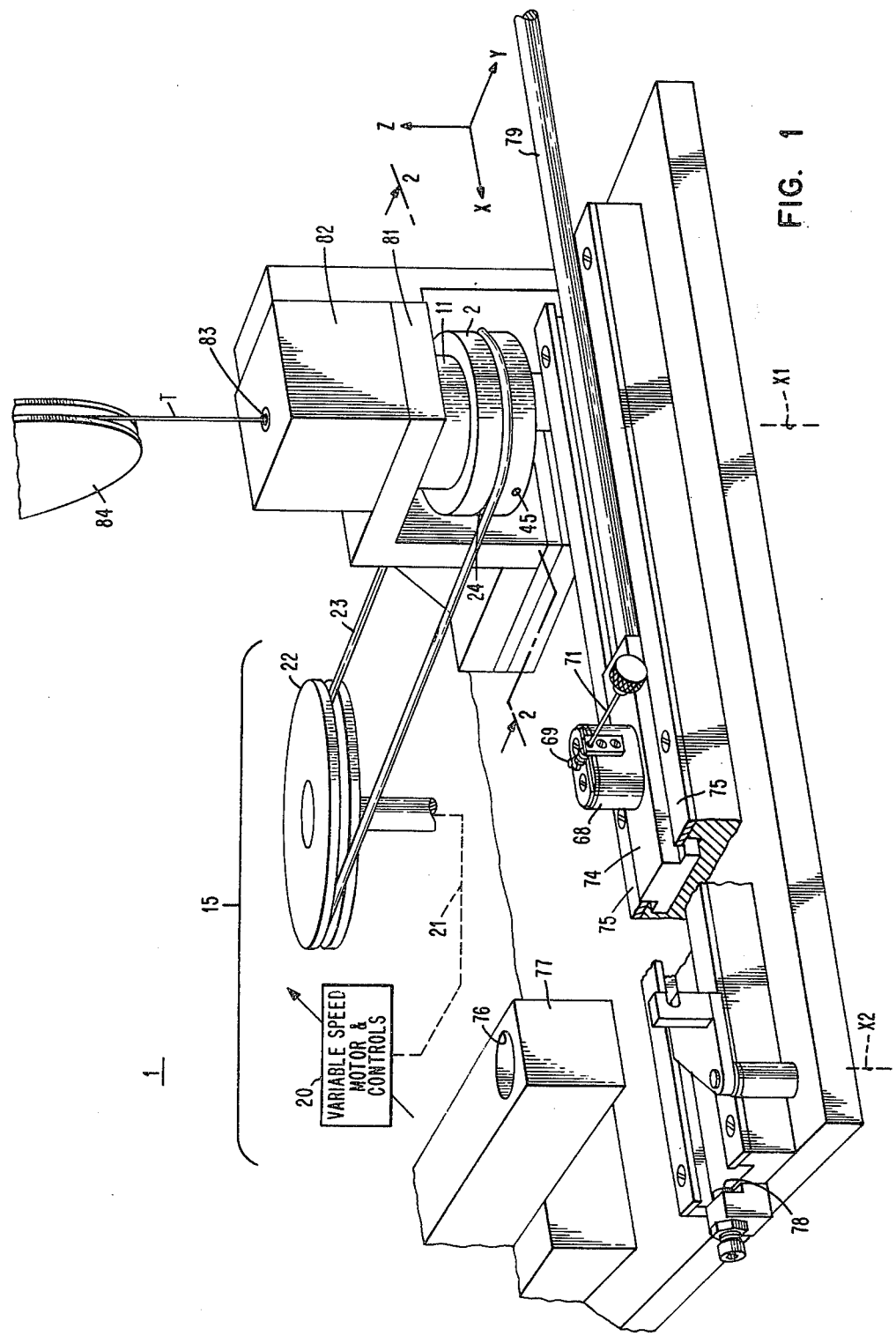
FIG. 1 is a perspective view of a preferred embodiment of the cutter apparatus of the present invention.

Referring to FIG. 1, there is shown a preferred embodiment of the cutter apparatus of the present invention for cutting objects with small cross sections. In the preferred embodiment, the apparatus cuts a piece from an elongated object, which has an inner core member and a concentric outer member, while concurrently cutting a predetermined portion of the outer member from the piece. More particularly, the object is a flexible thin walled tubing T with a hollow conductive core member of preferably copper, and with an outer covering that is a sleeve-like strippable electrical insulator. As explained in greater detail hereinafter, the apparatus concurrently cuts a piece from the tubing and a portion of the insulative covering. In the preferred embodiment, the apparatus also strips the cut portion from the piece.

The cut and stripped piece, cf. piece P shown in FIG. 11, is used as a precision electrical and mechanical insert component which is inserted into a predrilled defective plated thru hole, cf. hole H, of a printed circuit board B as explained hereinabove and described in greater detail hereinafter. By way of example, apparatus built in accordance with the principles of the present invention, is used to cut and strip pieces, cf. piece P, which has a copper core member M with circular inside and outside diameters D1 and D2 of fourteen and eighteen mils, respectively, and a dielectric insulation covering C with a thickness t of five mils, from tubing stock T of corresponding components and dimensions. Piece P is shown in FIG. 11 partially broken away at its lower right hand corner as viewed facing the Figure for sake of clarity.

Figure 2:
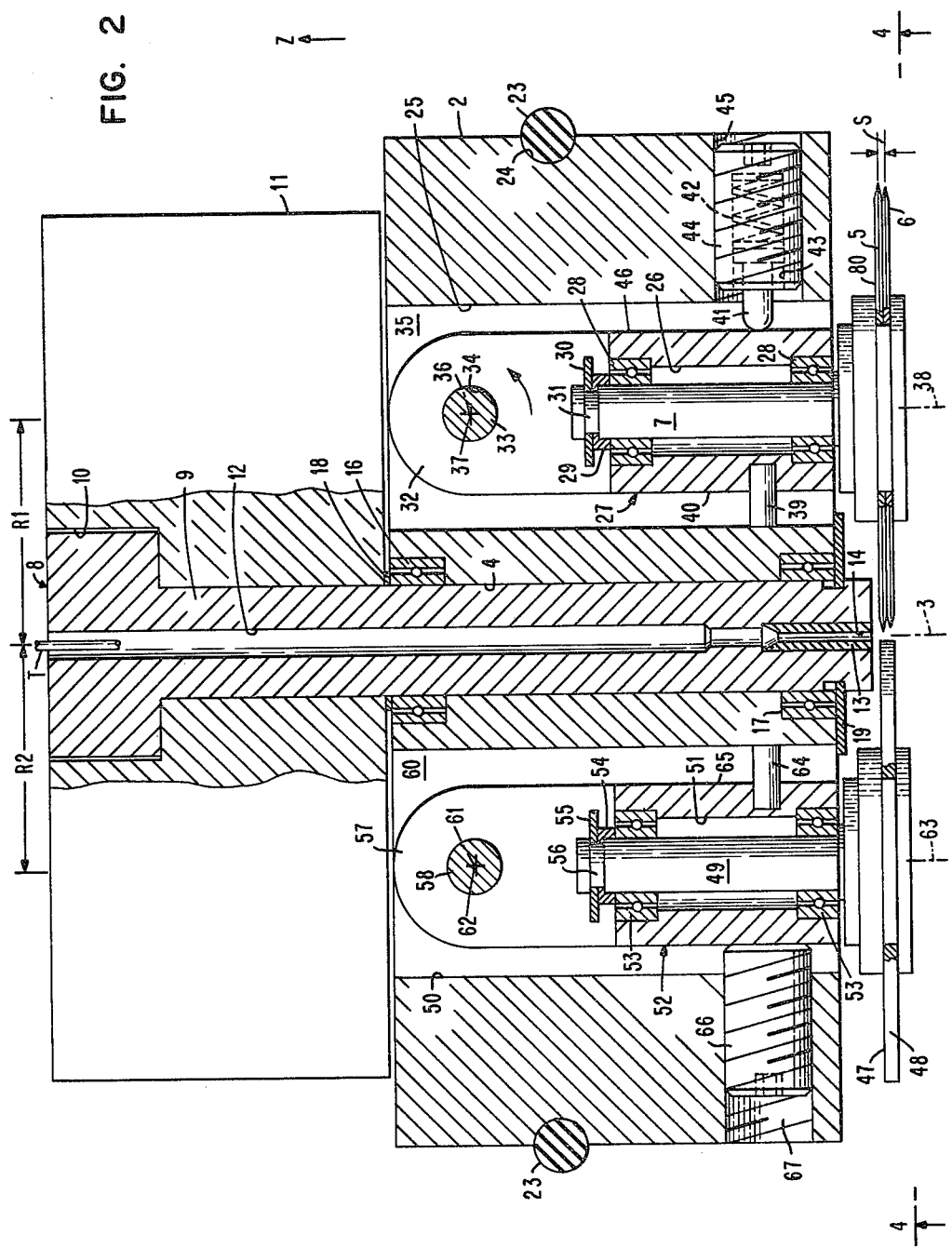
FIG. 2 is an enlarged cross sectional view of the preferred embodiment of the rotary head of the apparatus of FIG. 1 taken along the line 2—2 thereof.
Figure 3:
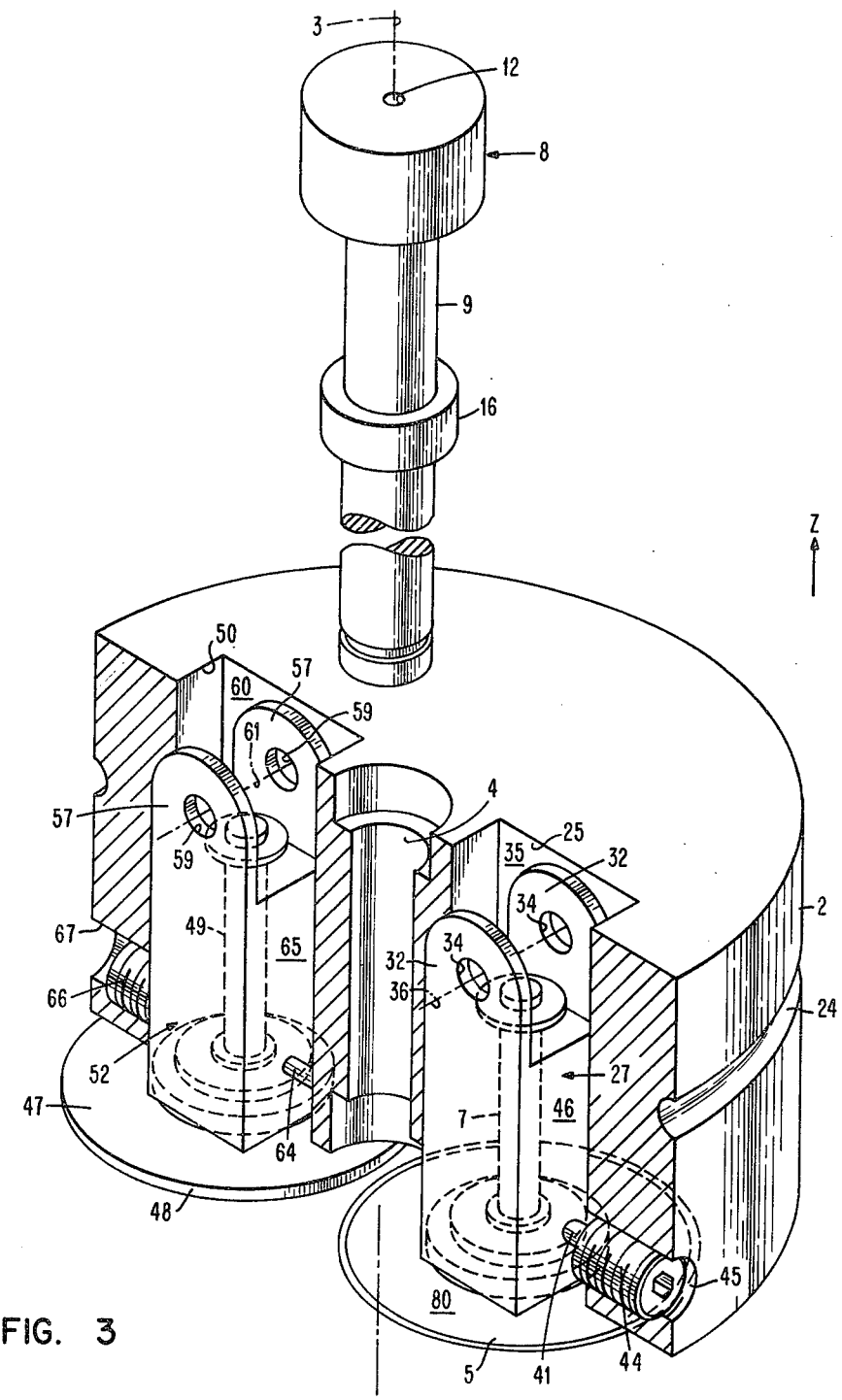
FIG. 3 is an isometric exploded view, shown partially in cross section, of the rotary head of FIG. 2.

The apparatus, generally indicated by the reference number 1 in FIG. 1, has a head 2 which is rotatable about a predetermined and preferably the central axis 3 thereof as shown in greater detail in FIGS. 2 and 3. For sake of explanation, the description herein is sometimes taken with respect to a reference datum system having orthogonal axes XYZ, axis 3 being substantially in parallel alignment with the reference axis Z, cf. FIG. 1, for example. The head 2 has an opening 4 which is concentric with the axis 3. First and second disc cutters 5 and 6 are mounted and affixed on a common shaft 7 at one end thereof and have a predetermined spacing S between them. The spacing S is correlated with the length of the cut portion A of the covering C to be eventually stripped from the cut piece P as shown in FIG. 10. The spacing S is thus the distance between the beveled cutting edges of the two disc cutters 5 and 6 when mounted on the shaft 7, it being understood that the spacing S can be varied, for example, by judicious selection of the thickness and bevel parameters of one or both cutters 5 and 6 and/or of the respective locations of the cutters 5 and 6 along the shaft 7 with or without the aid of an appropriate spacer, not shown. The shaft 7 is pivotably mounted to the head 2 at a predetermined radial distance R1 from the axis 3, and the disc cutter 5 is located, i.e. positioned, between the opening 4 and disc cutter 6.

Located in the opening 4 of head 2 are means, generally indicated by the reference number 8, for positioning the tubing T for advancement through the opening 4 coincidently along the axis 3 in a direction toward the cutters 5 and 6. As shown in FIGS. 2 and 3, means 8 has an elongated cylindrical shaped member 9 that is concentrically aligned within the opening 4 with the axis 3. Member 9 extends upwardly into the opening 10 of a stationary, i.e. non-rotative, member 11 to which the member 9 is mounted in a likewise stationary manner. The openings 4 and 10 are in axial alignment and have contours compatible to the outer shape of the member 9. The member 9 has a cylindrical shaped bore 12, the lower part of which is adapted to receive an interchangeable cylindrical bushing member 13 that has a bore 14. The diameter of the bore 14 is judiciously selected to provide a close slide fit with the particular diameter size of the tubing T. Each member 13 is provided with a bore 14 of different diameter size to allow accommodation of different diameter size tubing T. Bores 12 and 14 are in axial alignment with the axis 3.

Variable speed drive means, generally indicated by the reference number 15 in FIG. 1, continuously rotates the head 2 about the axis 3. In the preferred embodiment, the head 2 is rotatably mounted on the member 9 via the two bearings 16 and 17 and associated shim 18 and retaining ring 19, cf. FIG. 2, the latter elements 18 and 19 coacting to maintain the inner races of bearings 16 and 17 stationary with the stationary member 9. Head 2 is thus assembled to member 11 by virtue of the coaction of the elements 8 and 16–19 therewith, but nevertheless head 2 is free to rotate continuously, i.e. without stopping, about axis 3 while the members 9, 11 and 13 and tubing T are stationary, i.e. not rotating, even though the tubing T may be advancing in the axial direction, i.e. Z direction, through the members 9 and 13 and hence through the opening 4, or the head 2 is moving in the axial direction while the cut piece is not moving as is in the case during the preferred stripping operational mode hereinafter described.

The variable drive means 15 has an adjustable variable speed motor with appropriate speed controls. For sake of clarity, the motor with its controls is illustrated in schematic block form in FIG. 1 and indicated therein by the reference number 20. The shaft 21 of motor 20 is affixed to a belt pulley 22 which drives head 2 by its belt 23 when motor shaft 21 is turning. Head 2 has a compatibly contoured circumferential belt groove 24 for seating and frictionally coacting with the belt 23.

Referring to FIGS. 2 and 3 in greater detail, the head 2 has a rectangular opening 25 which extends therethrough in the Z direction. Opening 25 houses the shaft 7 and its associated mechanisms next to be described. Shaft 7 extends through the concentric bore 26 of a rectangular shaped member 27. Shaft 7 is rotatably mounted in the bore 26 by two bearings 28, the inner races of which are affixed to the shaft 7, and the outer races of which are stationary. Axial adjustment in the Z direction of the shaft 7 in bore 26 is provided by judicious selection of the height of a spacer 29 which is retained by the retaining ring 30 located in the collar groove 31 of shaft 7. The upper end of member 27 has two parallel extensions 32, only one of which is shown in FIG. 2. The extensions 32 have a yoke-like configuration and support their member 27 and thus shaft 7 on the pivot shaft 33 which passes through suitable openings 34 provided in the extensions 32 for this purpose. The ends of the shaft 33 in turn extend into and are affixed in openings, not shown, located in opposite walls of opening 25, only one of which walls, to wit: wall 35 is shown in FIGS. 2 and 3 for sake of clarity, and thereby affixes shaft 33 to the head 2. The center axis 36, FIG. 3, of shaft 33 is oriented such that it is perpendicular to the radial direction of axis 3 at the point 37, FIG. 2, of intersection of the axis 36 and center axis 38 of shaft 7.

A demountable interchangeable stop 39 is carried in the wall 40 of member 27 that limits the movement of the member 27 and hence shaft 7 and its disc cutters 5 and 6 carried thereby in the inward radial direction. It should be understood that in the preferred embodiment, the diameters of cutters 5 and 6 and the length of interchangeable stop 39, are judiciously selected such that as the shaft 7 pivots inwardly, cutter 5 cuts only through the sidewall of the tubing T from its outer surface to its inner surface and the cutter 6 cuts only through the covering of the tubing T. An axially adjustable stop 41 is affixed to a coil spring 42 which is mounted in the concentric opening 43 of cylindrical member 44. Member 44 is in threaded engagement with the side bore 45 of head 2. Stop 41 is biased by spring 42 against the opposite wall 46 of member 27.

In the preferred embodiment, apparatus 1 also has a disc shaped roller 47. The circumferential, i.e. lateral, surface 48 of roller 47 positions, i.e. guides, the tubing T during its advancement and supports it when being cut by the cutters 5 and 6. More particularly, in the preferred embodiment, roller 47 is mounted and affixed on a rotatable shaft 49. The shaft 49 is pivotably mounted to the head 2 at a predetermined radial distance R2 from the axis 3, distances R1 and R2 being substantially equal, and such that shafts 7 and 49 are diametrically aligned on opposite sides of axis 3. To this end, as shown in FIGS. 2 and 3 in greater detail, the head 2 has a rectangular opening 50 corresponding similar to opening 25 and which likewise extends through head 2 in the Z direction. Opening 50 houses the shaft 49 and its associated mechanisms next to be described.

Shaft 49 extends through the concentric bore 51 of a rectangular shaped member 52, which is substantially identical to member 27. In a similar manner as its counterpart 7, shaft 49 is rotatably mounted in the bore 51 by two bearings 53, the inner races of which are affixed to shaft 49, and the outer races of which are stationary. Axial adjustment in the Z direction of shaft 49 in bore 51 is provided by judicious selection of the height of a spacer 54 which is retained by the retaining ring 55 located in the collar groove 56 of shaft 49. The upper end of member 52 has two parallel extensions 57 which are in a yoke-like configuration and support their member 52 and thus shaft 49 on the pivot shaft 58 that passes through suitable openings 59 provided in the extensions 57. The ends of the shaft 58 in turn extend into and are affixed in openings, not shown, located in opposite walls of opening 50, only one of which walls, to wit: wall 60 is shown in FIGS. 2 and 3 for sake of clarity, thereby affixing shaft 58 to the head 2. The center axis 61, FIG. 3, of shaft 58 is oriented such that it is perpendicular to the radial direction of axis 3 at the point 62, FIG. 2, of intersection of the axis 61 and center axis 63 of shaft 49.

A demountable interchangeable stop 64 is carried in the wall 65 of member 52 prevents movement of the member 52 and hence shaft 49 and its roller 47 carried thereby in the inward radial direction. A stop 66, which is in threaded engagement with the side bore 67 of head 2, is adjusted to prevent movement of the member 52 and thus shaft 49 and roller 47 in the opposite, i.e. outer, radial direction. The surface 48 of roller 47 is in opposing alignment with the two cutting edges of cutters 5 and 6. Moreover, the diameter of roller 47, adjustment of stop 66, and the length of interchangeable stop 64, are judiciously selected such that the circumferential surface 48 of roller 47 is in tangential alignment with the outer wall of the tubing T when opposite thereto. Thus, as the tubing T slides past the surface 48 of roller 47 in the Z direction, or as the tubing T is being cut by cutters 5 and 6, tubing T and the surface 48 are in contacting relationship. The circumferential surface 48 of roller 47 thus acts as a guide and bearing support surface for the tubing T.

A holding fixture 68, FIG. 1, has a cylindrical opening 69 which receives the tubing T and holds the piece subsequently cut and stripped therefrom. Located in the opening 69 of fixture 68 is a stop 70, cf. FIG. 5, which is adjustable in the Z direction allowing the tubing T to be cut into pieces of a predetermined desired length. A plunger rod 71 is threadably engaged with the fixture 68 and is adapted to pass through an opening 72 that extends in a radial direction through the conical shaped outer wall 73, which is concentric with opening 69. After the leading end E of the tubing T comes to rest on the stop 70, rod 71 is advanced in the radially inward direction till it engages the side of tubing T thereby holding it in place.

In the preferred embodiment, the apparatus 1 has two work stations along the X direction that are generally indicated by the reference characters X1 and X2, respectively, in FIG. 1. The fixture 68 is transported by a linear transport system between the two stations X1 and X2. At station X1, the holding fixture 68 is located below head 2 and the cutters 5 and 6 with the center axis of its opening 69 co-aligned with the axis 3 by positioning the carrier 74 of the transport system on which fixture 68 is mounted. For this purpose, carrier 74, which is slideably engaged in the parallel tracks 75 that are aligned in the X direction, coacts with an appropriate stop, not shown, when positioned to station X1.

At station X2, the fixture 68 is positioned with the center axis of its opening 69 in alignment with the central axis of the cylindrical bore 76 of the frame block 77. A suitable adjustable stop 78 coacts with the carrier 74 to aid in the alignment. A cylindrical shaped tool, not shown, is concentrically mounted in bore 76 and has a retractable insertable tapered pin member, not shown, which when depressed enters and frictionally engages the inner side walls of the hollow core member of the cut and stripped piece located in opening 69 of fixture 68. With rod 71 in its horizontal retracted position, when the pin is withdrawn to its vertical retracted position, the pin carries with it the piece thereby releasing the piece from fixture 68 and from which pin the piece is subsequently and more readily removed. Thereafter, the carrier 74 and hence fixture 68 is returned to station X| to begin the next cycle. By way of example, carrier 74 is shown in FIG. 1 as being affixed to the piston rod 79 of a pneumatically driven actuator which shuttles the carrier 74 between the two work stations X1 and X2.

The member 11, and hence the rotatable head 2 mounted thereto, is axially moveable in the Z direction by appropriate means, not shown, which moves the member 11 between a normally raised position, sometimes referred to herein as the home position, and a lower cutting position shown by way of reference with respect to the top surface 80 of cutter 5 and its corresponding upper and lower position coordinates Z1 and Z2, respectively, of FIGS. 5 and 6, for example. Thus, it should be understood that with regards to FIGS. 5 to 10 and as shown by the respective positions of the cutter 5 therein, the member 11 is in the home position in FIGS. 5 and 10 and is in the cutting position in FIGS. 6 to 9.

Suitable linear bidirectional moving means for moving head 2 up and down are well known in the art and hence omitted herein for sake of clarity. By way of example, a worm gear installation may be used for this purpose, wherein the screw gear, i.e. worm, is affixed atop of the member 11 and its associated worm gear, i.e. worm wheel, is affixed to the shaft of a reversible electric motor. The worm wheel is driven by the motor in one direction to move the member 11 to its home position and in the reverse direction to move it to its cutting position. The worm gear installation and motor are supportably mounted on the frame bracket 81 and housed within the cover 82. As a result, the assembly of members 2, 8 and 11 is supported also by bracket 81. Bracket 81 has an opening, not shown, through which member 11 moves freely up and down between its raised and lower positions. A feedthrough opening 83 for feeding the tubing T therethrough is provided in the cover 82 and is aligned with the bore 12 of member 9. Adjustable stops, not shown, coacting with member 11 set the upper and lower position coordinates Z1 and Z2. The distance between coordinates Z1 and Z2 is judiciously correlated with the clearance required to strip the cut portion of the covering C from the cut piece of tubing T and to move the fixture 68 with the cut and stripped piece from under the raised head 2 by the carrier 74 along the tracks 75.

In operation, apparatus 1 is initially set up with the empty fixture 68 at work station W1 and head 2 in its raised, i.e. upper, position. During the initial cycle, the tubing T is advanced from the spool 84 through the opening 83 and from thence into the bores 12 and 14. During the initial cycle, when the tubing T is first being fed to the apparatus 1, head 2 can be stationary, i.e. non-rotating, but preferably head 2 is already rotating, as members 9, 11 and 13, as well as tubing T, are not and are incapable of rotation irrespective of the rotation of head 2. It should be understood that means 15 thereafter continuously rotates, albeit at different speeds in accordance with the principles of the present invention, once rotation of the head 2 about axis 3 is begun. The head 2 is rotated by the variable speed drive means 15 at a predetermined speed, hereinafter referred to as the first speed. This first speed is at or below some predetermined threshold speed, at or below which threshold speed centrifugal forces are ineffectual to pivot shaft 7 radially outward. Under these conditions, as well when head 2 is at at zero speed, that is not rotating, the top surface 80 of cutter 5 is located in a obstructing relationship with the leading end E of the tubing T, cf. FIG. 5, and spring 42 urges stop 41 against member 27 to provide a positive bias in the inward radial direction.

Thus, as tubing T continues to be advanced after emerging from bore 14 coincidently along axis 3 towards cutters 5 and 6, it comes in contact with the surface 80 of the disc cutter 5, which temporarily stops its advancement in the Z direction as shown in FIG. 5. On its opposite side, tubing T is also placed in partial contact with the upper part of circumferential surface 48 of roller 47. At this time, the surface 48 of roller 47 becomes partially frictionally engaged with the sidewall of tubing T. However, should this partial frictional engagement of roller 47 with tubing T in combination with the orbiting motion of the roller 47 produced by the rotation of head 2 about axis 3 result in any rotation of roller 47 and its shaft 49 about their common axis 63, FIG. 2, it does not adversely effect the operation of apparatus 1 as is apparent to those skilled in the art. Likewise, if the frictional engagement between the leading end E of tubing T and upper surface 80 of cutter 5 result in any rotation of the cutters 5 and 6 and the shaft 7 about their common axis 38, it too does not adversely effect the operation of apparatus 1. Generally, however, in both these cases the frictional engagement is insufficient to cause rotation of roller 47 or the cutters 5 and 6.

Next, while still being rotated at the first speed, head 2 is lowered changing the location of surface 80 from the upper position coordinate Z1 to the lower positioning coordinate Z2, the leading end E continuing to remain in contact with surface 80 and its advancement continuing to be blocked thereby, cf. FIG. 6.

After head 2 is in its lower position, it is rotated by the drive means 15 at an increased second speed relative to the first speed which pivots the shaft 7 about shaft 33 centrifugally to an outer radial position relative to axis 3. The centrifugally force overcomes the spring force of spring 42 being exerted by stop 41 against member 27. Pivoting shaft 7 to the outer radial position, displaces the first cutter 5 and also the smaller diameter cutter 6 thereby removing them from the contacting and obstructing relationship with the leading end E of the tubing T as shown in FIG. 7.

As a result, tubing T is allowed to be further advanced in the Z direction along the axis 3 to a predetermined axial position Z3 that is beyond the second disc cutter 6 as shown in FIG. 8. In the preferred embodiment, position Z3 is determined by the setting of the adjustable stop 70 in fixture 68. The surface 80 of cutter 5 thus provides a reference or datum plane that in combination with stop 70 provides apparatus 1 with the capability of cutting the pieces of tubing T and/or portions of the insulation covering C in uniform and precision lengths.

As the leading end E of tubing T is advanced past surface 48, the frictional surface engagement between the surface 48 and sidewall of tubing T increases. Thus, the roller 47 and its shaft 49 in combination with their orbiting motion about axis 3 freely rotate about axis 63. The resultant rolling friction further facilitates the sliding movement of the advancing tubing T against surface 48. After, the advancement of the tubing T becomes blocked by the stop 70, plunger rod 71 in fixture 68 is moved radially inward to abut the sidewall of tubing T thereby securing it in place.

Next, head 2 is rotated by the drive means 15 when tubing T is in the axiall position Z3 at a reduced third speed relative to the aforementioned second speed. The third speed causes shaft 7 to pivot about shaft 33 centripetally radially inward towards axis 3. This action places at least one of the knife edges of cutters 5 and 6 in a respective lateral contacting relationship with the sidewall of tubing T. The contact, in coaction with the rotation of the head 2 about axis 3, causes shaft 7 and the affixed two cutters 5 and 6 to freely rotate about the axis 38. In the particular embodiment of apparatus 1, cutter 5 contacts the sidewall of tubing T first, i.e. prior to cutter 6, this being a function of the parameters related to the respective diameters of the larger cutter 5 and the smaller cutter 6 and the spacing S, for a given radius R1 and pivot radius of the cutters 5 and 6 about axis 36 of shaft 33. In any case, as a result of the rotation of the head 2 about the axis 3, which thus orbits the cutters 5 and 6 on shaft 7 about axis 3, in coaction with the rotation of the two cutters 5 and 6 about axis 38, the sidewall of tubing T begins to be scored circumferentially by the respective knife edges of the two cutters 5 and 6 as shown in FIG. 9. The two parallel scorings cut deeper and deeper concurrently into the sidewall of the tubing T at their respective points of contacts with tubing T as the centripetal force, in coaction with the spring force being exerted by the bias spring 42, continues to move cutters 5 and 6 in the inward radial direction towards axis 3. During the cutting operation, the relative directions of rotation of head 2, cutters 5 and 6, and roller 47 are indicated by the arrows A1, A2, A3, respectively, as shown in FIG. 4, direction A1 being arbitrarily assumed counterclockwise as viewed therein for sake of explanation. The dash line circle C1 shown in FIG. 4 represents the locus of the central axis 38 of shaft 7 as it is orbited by the head 2 around axis 3 when head 2 is rotating at the aforementioned first speed. Likewise, circles C2 and C3 represent the respective loci of axis 38 when head 2 is rotating at an intermediate speed and the aforementioned second speed, respectively.

As aforementioned, the movement of cutters 5 and 6 in the inward radial direction is terminated by stop 39 at which point the tubing T will have cut therefrom the piece P by the cutter 5, and the portion A of the covering C on the piece P will have been cut by the cutter 6. In this manner, apparatus 1 thus provides the concurrent cutting of the piece P from the tubing T and the portion A from the covering C.

When this occurs, the portion A will still be on the core member M of the piece P and positioned between the cutters 5 and 6. Accordingly, without the need of stopping the rotation of the head 2, which is still being rotated at the third speed, the cut portion A is removed, that is stripped, from the cut end F of the piece P by a relative axial displacement along axis 3 between the cut piece P and the head 2 whereby the cut portion A is carried off between and by the two cutters 5 and 6 as shown in FIG. 10. As aforementioned, in the preferred embodiment this preferably done by raising the head 2 to its raised position. During this time, it should be noted that the new leading end of the tubing T is in contact with the surface 80 of cutter 5 and hence its advancement is blocked. The portion A is then removed between the cutters 5 and 6 by any appropriate means such as the blast from a pneumatic jet, not shown, juxtaposed thereto.

After the head 2 is raised, fixture 68 is positioned to the other work station X2 by the transport system, i.e. members 74, 75 and 79, and advancement of tubing T continues to be remained blocked by surface 80 at station X1. At station X2, rod 71 is retracted, thereby releasing the piece P in fixture 68, which is then removed by the aforementioned pin insertion tool, not shown, in the manner previously described. The fixture 68 is then returned to the work station X1 by the transport system and apparatus 1 is ready for the next cycle. At the beginning of the aforementioned next cycle and all subsequent cycles, the tubing T is in position adjacent to surface 80 of cutter 5, and hence is ready for advancement at this point.

Referring to FIG. 11, the piece P is inserted as a precision component in a predrilled defective via hole H of a laminated multilayer printed circuit board B in the manner previously described. The insertion can be done directly with the tool, not shown, used at station X2, or by any other appropriate tool. The covering C is co-extensive with the length of the hole H and only the stripped part of the member M extends past the circular printed circuit pad G, both the extension and pad G being shown greatly exaggerated for sake of clarity. The extension is subsequently formed into an aforementioned flange and solder bonded to the pad G. By way of explanation, the piece P' in the adjacent defective via hole H' is shown with its extension formed into a flange J. An aforementioned modified bifurcated connector K is inserted into the other end of the core member of piece P', and a solder bond L bonds the base of the connector K to the inner wall of the core member of piece P' and the flange J to the pad G associated with hole H'.

It should be noted that only shaft 7 and hence cutters 5 and 6 are free to pivot as head 2 rotates. Prior to the initiation of the operation of apparatus 1, the radial position of shaft 49 on shaft 58 is determined and fixed by preadjusting the stops 64 and 66 so as to align the circumferential surface 48 of roller 47 with the sidewall of the tubing T for the particular size being cut so as to provide the aforedescribed tangential relationship. Hence, during rotation of the head 2, shaft 49 is not free to pivot on shaft 58, but roller 47 can turn freely on the shaft 49.

The foregoing structural combination of apparatus 1 in combination with the aforedescribed variable speed control manner used for radially moving only the cutters 5 and 6 and their common shaft 7, is readily more simple and hence more reliable in contrast to the multiple radial moving elements and their associated radial mechanical advancing systems of the rotary heads of the prior art. In addition, the structural combination of the apparatus 1 allows objects to be cut and/or stripped in a clean and precisionlike manner and without limitation as to the minimum size of the objects that can be cut thereby. Moreover, this allows apparatus 1 to be more readily adaptable for automation and/or implementation for mass production use. Furthermore, by employing centripetal action during the cutting operation, head 2 can be operated at relatively lower speeds thereby decreasing the cost of operation and/or deleterious effects caused by overheating and the like between the object being cut and the disc cutters as is the case in prior art high speed rotary apparatus.

It should be noted that the variable speed motor 20 can be a multiple speed motor with distinct appropriate operating speeds, e.g. a two or three speed motor types. However, preferably motor 20 is of the type which can operate over an appropriate wide range of speeds so as to provide apparatus 1 with more versatility for different applications. In most applications, the cutting speed, i.e. the aforementioned third speed, and the blocking speed, i.e. the aforementioned first speed, are substantially equal. In the aforementioned apparatus built in accordance with the principles of the present invention and used to cut and strip insulated copper tubing having the aforedescribed parameters, its head was rotated at equal blocking and cutting speeds of 1200 rpm, corresponding to the aforementioned first and third speeds, respectively, and at an increased speed of 1800 rpm, corresponding to the aforementioned second speed to remove the cutters 5 and 6 radially outward in the non-obstructing relationship.

Thus, while the invention has been described with reference to a preferred embodiment thereof, it will be understood by those skilled in the art that various changes in form and details may be made without departing from the scope of the invention.

We Claim:

1. Apparatus for cutting a piece from an elongated object having an inner core member and a concentric outer member and a predetermined portion of said outer member from said piece, said apparatus comprising:

a head rotatable about a predetermined first axis, said head having an opening concentric with said first axis, first and second disc cutters mounted on a common shaft with a predetermined spacing therebetween, said shaft being rotatable about a second axis, and said shaft being pivotably mounted to said head a predetermined distance from said first axis, said first disc cutter being positioned between said opening and said second cutter, means for positioning said object for advancement through said opening coincidentally along said first axis in a direction towards said cutters, and variable speed drive means for continuously rotating said head about said first axis, said head being rotated at a first speed by said drive means to pivot said shaft to an inner first radial position to place said first disc cutter in contacting and obstructing relationship with the leading end of said object and prevent the advancement thereof, said head being rotated by said drive means at an increased second speed relative to said first speed to pivot said shaft centrifugally to an outer second radial position to displace said first cutter from said contacting and obstructing relationship with said leading end of said object to allow further advancement of said object in said direction along said first axis to a predetermined axial position along said first axis beyond said second cutter, and said head being rotated by said drive means when said object is in said predetermined axial position at a predetermined reduced third speed relative to said second speed to pivot said shaft centripetally radially inward towards said first axis to place at least one of said first and second cutters in a predetermined lateral contacting relationship with said object to effect in coaction with said rotation of said head about said first axis the rotation of said shaft and said first and second cutters about said second axis, said rotation of said head about said first axis in coaction with said rotation of said first and second cutters about said second axis thereby effecting concurrent cutting of said piece from said object and of said portion from said outer member of said piece by said first and second cutters, respectively.

2. Apparatus according to claim 1 wherein the cut said portion is positioned between the two said cutters, and said cut portion is removed from the cut end of said piece by a predetermined relative axial displacement along said first axis between said cut piece and said head whereby said cut portion is carried between and by said two cutters.

3. Apparatus according to claim 1 further comprising disc shaped roller means affixed to a second shaft rotatably mounted to said head about a third axis at a predetermined radial second distance from said first axis, said second and third axes being diametrically located on opposite sides of said first axis, said roller means having a lateral surface for positioning and support of said object during the advancement and cutting of said object.

4. Apparatus according to claim 1 wherein said object is tubing, said inner core member being a predetermined conductive metal and having a thin wall hollow configuration, and said outer member is an electrical insulator covering.

5. Apparatus according to claim 1 wherein said first and third speeds are substantially equal.

6. Apparatus according to claim 1 wherein said first disc cutter provides a reference plane for cutting said piece in a predetermined uniform length.

7. Cutter apparatus for cutting tubing, said tubing having a hollow conductive inner member and an outer conformal dielectric member, said apparatus cutting at least one piece from said tubing and a portion of the dielectric of said piece, said apparatus comprising:

a head rotatable about a predetermined first axis, said head having an opening concentric with said first axis, first and second disc cutters mounted on a common shaft, said first and second cutters being spaced on said shaft with a predetermined spacing therebetween commensurate to the length of said portion to be cut, said shaft being rotatable about a second axis, and said shaft being pivotably mounted to said head a predetermined distance from said first axis, said first disc cutter being positioned between said opening and said second cutter, means for positioning said tubing for advancement through said opening coincidentally along said first axis in a direction towards said cutters, and variable speed drive means for continuously rotating said head about said first axis, said head being rotated at a first speed by said drive means to pivot said shaft to an inner first radial position to place said first disc cutter in contacting and obstructing relationship with the leading end of said tubing and prevent the advancement thereof, said head being rotated by said drive means at an increased second speed relative to said first speed to pivot said shaft centrifugally to an outer second radial position to displace said first cutter from said contacting and obstructing relationship with said leading end of said tubing to allow further advancement of said tubing in said direction along said first axis to a predetermined axial position along said first axis beyond said second cutter, and said head being rotated by said drive means when said tubing is in said predetermined axial position at a predetermined reduced third speed relative to said second speed to pivot said shaft centripetally radially inward towards said first axis to place at least one of said first and second cutters in a predetermined lateral contacting relationship with said tubing to effect in coaction with said rotation of said head about said first axis the rotation of said shaft and said first and second cutters about said second axis, said rotation of said head about said first axis in coaction with said rotation of said first and second cutters about said second axis thereby effecting concurrent cutting of said piece from said tubing and of said portion from said outer member of said piece by said first and second cutters, respectively.

8. Apparatus according to claim 7 wherein the cut said portion is positioned between the two said cutters, and said cut portion is removed from the cut end of said piece by a predetermined relative axial displacement along said first axis between said cut piece and said head whereby said cut portion is carried between and by said two cutters.

9. Apparatus according to claim 7 further comprising disc shaped roller means affixed to a second shaft rotatably mounted to said head about a third axis at a predetermined radial second distance from said first axis, said second and third axes being diametrically located on opposite sides of said first axis, said roller means having a lateral surface for positioning and support of said tubing during the advancement and cutting of said tubing.

10. Apparatus according to claim 7 wherein said first disc cutter provides a reference plane for cutting said piece in a predetermined uniform length.

* * * * *